Patented Aug. 21, 1934

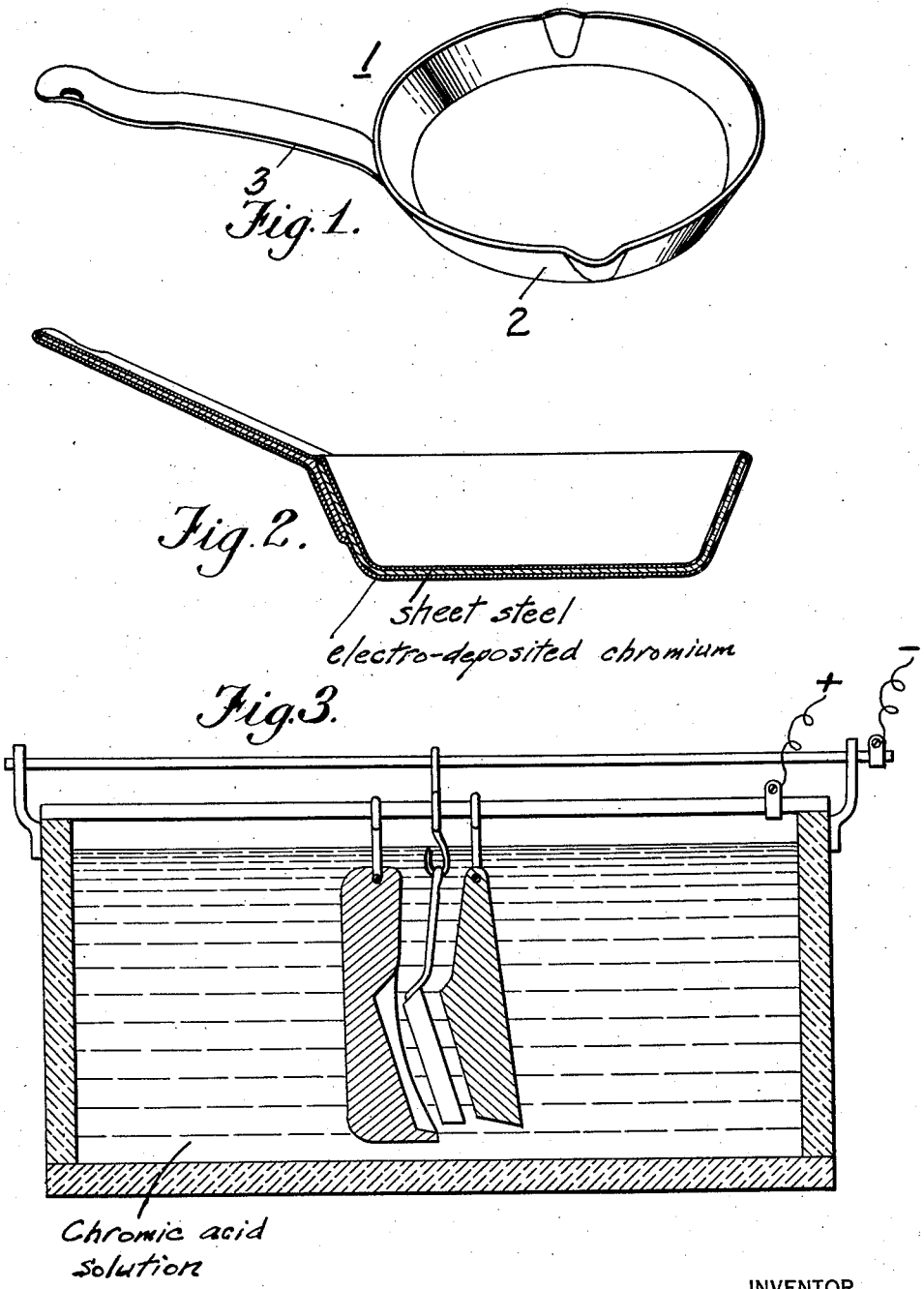

1,970,723

UNITED STATES PATENT OFFICE 1,970,723

COOKING UTENSIL AND METHOD OF MAKING IT

Harry C. Wolfe, Pittsburgh, Pa.

Application February 24, 1931, Serial No. 517,829

3 Claims. (Cl. 53—1)

This invention relates to kitchen utensils, particularly to pans for frying, cooking, baking, etc., and to the method of making them.

The primary object of this invention is to provide a pan that shall be relatively easy to keep clean, and that shall permit easy removal of food adhering to its surface, without necessitating scraping of the surface metal.

Another object of this invention is to provide a pan with a lustrous surface that shall not tarnish or oxidize easily, and that shall withstand high cooking temperatures without discoloring.

Another object of the invention is to provide a plating solution that is particularly effective.

In the accompanying drawing I have illustrated the invention as applied to a frying pan, although, of course, any cooking utensil may be similarly made.

In making up the utensil I first stamp the shell or pan from sheet steel to the desired shape. Where the pan is provided with a handle as in the case of a frying pan, the handle is spot welded to the pan, or connected in any other suitable manner. The sheet steel from which the pan is so stamped and shaped is normally in a fairly clean condition, in which it is free of flake oxides, etc. After the pan is shaped it is polished, however, with the usual emery canvas wheel and emery paste to remove the thin oxide layer and other dirt that may have accumulated on the surface. The utensil is then next mechanically cleaned with gasoline and scrubbed to remove the greasy emery paste that was used in the polishing operation and also to remove the oily spots due to manual handling. The entire utensil is then inserted in an alkaline cleaning electrolite for an electro-cleaning operation. After the electro-cleaning operation the utensil is removed from the electro-lite and rinsed with cold water, and it is then introduced into a chromic acid solution as a cathode, being placed adjacent an anode having a surface contour corresponding to that of the pan or utensil which is to be plated.

The plating operation is established during successive five-minute intervals with a ten-second interruption of the plating action between each plating interval. The plating action is interrupted by interrupting the circuit while the utensil is still in the plating solution. The total plating time for this application is about one hour.

Such interrupted plating action during successive intervals permits a relatively high current density to be employed without developing excessive internal strains in the chormium deposit. With this process I have been able to deposit a relatively thick layer of chromium that is strongly adherent to the sheet steel base and is homogenous and ductile in character. The deposit is relatively lustrous when the utensil is removed from the plating solution and requires no buffing or polishing.

It has been customary in the plating of certain articles, of which the automobile radiator shell is probably the most familiar, to deposit a layer of copper on the sheet steel shell, and then a layer of nickel on the copper, and a final layer of chromium on the nickel. That treatment is satisfactory for that application, where the chromium surface is desired only for its non-tarnishing character, but it would not be entirely satisfactory for applications where the treated metal is to be subjected to a high temperature such as is encountered by a utensil placed over an open flame for cooking purposes.

The process disclosed herein, however, is satisfactory to establish a closely adhering bond between the chromium and the sheet steel base, since the accumulation of internal stresses in the deposit is obviated by the periodic interruption of the plating action.

A utensil so treated is not discolored by direct contact with an open flame, due to the highly refractory character of the chromium surface, and it may be easily kept clean, and always has a clean-appearing lustrous surface which does not readily tarnish or oxidize.

A frying pan is illustrated in the accompanying drawing, in which,

Figure 1 is a perspective view of a frying pan treated in accordance with the process described herein;

Figure 2 is an enlarged sectional view showing the layers of chromium on the steel base; and Figure 3 is a schematic view of an electro-plating bath and illustrates the disposition of a utensil as a cathode in the plating solution, adjacent correspondingly shaped anodes.

The form of kitchen utensil described herein is illustrative of kitchen utensils in general, and it is shown as a frying pan 1 consisting of the shell 2, within which the food is to be treated, and a handle 3 thereon.

In manufacturing the utensil, the shell 2 is stamped and drawn from normally flat sheet steel to the desired size and shape. The handle 3 is like-wise stamped and shaped from normally flat sheet steel to the desired size and shape. The handle is then secured to the shell 2, being preferably spot welded thereto in order to provide a completely closed inner surface on the shell, without perforations, as would be necessary if rivets were used.

The utensil is then prepared for treatment by being mechanically cleaned and polished by an emery canvas wheel and by emery paste. It is next cleaned and scrubbed with gasoline to remove all hand oils and the grease of the emery paste, and is then immersed in an alkaline electro-lite such as a solution containing sodium hydroxide and sodium phosphate. This solution may be made of about three ounces of the mixture to a gallon of water, the mixture consisting of about 35% sodium hydroxide, 15% sodium phosphate and the balance of water. The cleaning action is effected by subjecting the utensil to cathodic action in the electro-lite for a period of about three minutes at a current density of about 25 amperes per square foot area, and then, by reversing the circuit connections, subjecting the utensil to anodic action in the electro-lite for a period of about one and a half minutes, at a current density of about 15 amperes per square foot area.

The cathodic treatment generates hydrogen at the surface of the utensil and cleans it of the oils, grease and light surface oxidation. The subsequent anodic treatment then eliminates and forces out of the metal surfaces any gas absorbed or accumulated therein, so a better surface bond can be effected, in the electro-deposition operation.

After the electro-cleaning operation, the utensil is removed from the electro-lite and rinsed with cold running water, and is then introduced directly as a cathode into a chromic acid bath in which the utensil is disposed between two anodes having their adjacent surfaces shaped to conform with the shape of the utensil so that the spacing between the surfaces of the utensil and the surfaces of the adjacent anodes will be uniform.

The plating solution which I have found preferable for this purpose in order to deposit a relatively hard layer of chromium that shall be homogeneous and strongly adherent to the sheet steel base of the utensil, under the various temperature conditions to which it will be subjected, consists of

|   | g/L |
|---|---|
| Chromic acid ($CrO_3$) | 250 |
| Sulfuric acid ($H_2SO_4$) | 2½ |
| Metallic trivalent chromium | 5 |
| Metallic iron | 4 |

I subject the utensil to about one hours plating action, utilizing a current density of about 250 amperes per square foot of utensil surface, and interrupting the plating action at the end of successive five minute intervals. Each interruption of the plating action is made for about ten seconds by interrupting the plating circuit without removing the utensil from the solution. The temperature of the solution is maintained at about 116 degrees Fahrenheit.

With a plating operation under these conditions a relatively heavy deposit is made which is lustrous in appearance when the utensil is removed from the plating solution. No subsequent buffing or polishing is therefore necessary.

This feature is important since the ordinary deposit of chromium upon chromium is a satin or dull surface which is difficult to polish to a lustrous condition. The present process and the solution described herein, however, cause the deposits to assume a naturally lustrous condition without requiring any buffing or polishing.

The deposit is made directly on the steel and is homogeneous, strongly adherent under normal and elevated cooking temperatures. Due to the interrupted action, the successively plated layers are free of internal strains and prevent the accumulative effect of pin-hole development of steady continuous plating action.

By means of this treatment I have provided a kitchen utensil having a surface that is permanently lustrous and clean-looking, and that is relatively easy to keep clean since it does not oxidize or tarnish under atmospheric conditions nor when subjected to the open gas flame during cooking operations. Food does not adhere closely to the cooking surfaces and these surfaces may be cleaned easily without scouring after a cooking operation. Such pans provide an advance in the sanitary conditions and sanitary appearance of utensils in the kitchen.

My invention is not limited to the specific type of utensil that is illustrated since it may be obviously applied to all pots and pans and utensils employed in cooking and baking operations without departing from the spirit and scope of the invention as set forth in the appended claims.

I claim as my invention:

1. A cooking utensil consisting of a stamped sheet metal base having an integral deposit of chromium thereon formed of a plurality of progressively deposited layers of chromium in the original deposited condition.

2. A cooking utensil consisting of a stamped and shaped sheet steel base having an integral deposit of chromium thereon consisting of a plurality of progressively deposited layers of chromium in original surface-to-surface relationship as deposited.

3. A cooking utensil constituting a container consisting of a metal base having an integral deposit of chromium thereon formed of a plurality of progressively deposited layers of chromium in the original deposited condition.

HARRY C. WOLFE.